(12) United States Patent
Turati

(10) Patent No.: US 6,270,283 B1
(45) Date of Patent: Aug. 7, 2001

(54) BEARING STRUCTURE FOR CABINETS PREFERABLY CONTAINING ELECTRIC AND/OR ELECTRONIC APPARATUSES

(75) Inventor: Aldo Turati, Caslino d'Erba (IT)

(73) Assignee: E.T.A. S.p.A. (IT)

( * ) Notice: Subject to any disclaimer, the term of this patent is extended or adjusted under 35 U.S.C. 154(b) by 0 days.

(21) Appl. No.: 09/338,186

(22) Filed: Jun. 22, 1999

(30) Foreign Application Priority Data

Jul. 1, 1998 (EP) .................................................. 98830397

(51) Int. Cl.[7] .................................................. A47B 47/00
(52) U.S. Cl. ........................ 403/217; 403/174; 403/219; 403/231
(58) Field of Search .................................. 403/170, 174, 403/188, 217, 219, 230, 231, 258, 260, 262, 403

(56) References Cited

U.S. PATENT DOCUMENTS

| 2,058,263 | | 10/1936 | Rosendale . | |
|---|---|---|---|---|
| 3,087,768 | * | 4/1963 | Anderson et al. | 406/217 X |
| 3,542,407 | * | 11/1970 | Brown | 406/174 X |
| 4,066,370 | * | 1/1978 | Van Driessche | 403/217 |
| 5,066,161 | * | 11/1991 | Pinney | 403/219 X |
| 5,305,571 | * | 4/1994 | Trevino | 403/217 |
| 5,680,737 | * | 10/1997 | Sheipline | 403/217 X |
| 5,695,263 | * | 12/1997 | Simon et al. | 403/231 X |
| 5,997,117 | * | 12/1999 | Krietzman | 403/219 X |
| 6,062,664 | * | 5/2000 | Benner | 403/231 X |

FOREIGN PATENT DOCUMENTS

| 38 29 424 A1 | 3/1990 | (DE) . |
|---|---|---|
| 2 674 581 | 10/1992 | (FR) . |
| 2 681 403 | 3/1993 | (FR) . |
| 2 697 300 | 4/1994 | (FR) . |
| 0 649 205 A1 | 4/1995 | (FR) . |

OTHER PUBLICATIONS

European Search Report, Abstract FR 2681403A.
European Search Report, Abstract FR 2697300A.
European Search Report, Abstract FR 2674581A.
European Search Report, Abstract DE 3829424A.
European Search Report, Abstract EP 649205A.

* cited by examiner

Primary Examiner—Lynne H. Browne
Assistant Examiner—David E. Bochna
(74) Attorney, Agent, or Firm—Robert F. I. Conte; Lee, Mann, Smith, McWilliams, Sweeney & Ohlson

(57) ABSTRACT

A bearing structure for cabinets preferably containing electric and/or electronic apparatuses is provided, which comprises a predetermined number of metal section members, defining upright elements (2) and crosspiece elements (3), and connectors (4) between the section members which is adapted to be disposed in an operatively functional position to join the upright elements (2) to the crosspiece elements (3) independently of engagement of panels defining the cabinet top and base with the crosspiece elements.

17 Claims, 5 Drawing Sheets

BEARING STRUCTURE FOR CABINETS PREFERABLY CONTAINING ELECTRIC AND/OR ELECTRONIC APPARATUSES

FIELD AND BACKGROUND OF THE INVENTION

The present invention relates to a bearing structure for cabinets preferably containing electric and/or electronic apparatuses comprising a predetermined number of metal section members defining upright elements and crosspiece elements and connectors between the section members disposed at each cabinet vertex where three of the section members converge. The connectors comprises first junction elements between said crosspiece elements, adapted to form at least one first and one second surrounding frames therewith, which frames are intended to be the engagement support of a first metal panel or slab defining the cabinet roof or top and a second panel defining the cabinet base or floor.

It is known that cabinets or containers for electric and/or electronic apparatuses of several different kinds may comprise a bearing structure or support framework formed of metal section members both for the vertical or upright elements and the horizontal or crosspiece elements.

Section members are joined to each other by connectors adapted to engage the ends of the three section members converging at each vertex, into the vertex itself.

In order that expenses for transportation and storage of the above-cabinets should be contained within reasonable limits, the bearing structure, closing panels or slabs and doors intended to be engaged with said structure are generally at least partly mounted and assembled at the place of use, i.e. in situ.

Practically, the connectors between the section members generally comprises first junction elements between the crosspiece elements, adapted to enable formation of stiff surrounding frames therewith, which frames will form the support for engagement of the panels or slabs defining the cabinet top and base.

In order to reduce the number of assembling operations to be carried out in situ without, on the other hand, substantially varying bulkiness of the individual disassembled components of a cabinet, it would be desirable that mounting of some of said components should take place already at the factory.

In particular, bulkiness for transportation and storage of the panels forming the cabinet top and base should not be substantially modified if mounting of said surrounding frames and assembling of said panels therewith should be done in advance.

However, in the known art the above mentioned advantageous operations cannot be done because the connectors between section members generally comprises removable jointing members, screws for example, between said first junction elements supporting the crosspiece elements, and second junction elements in engagement with the section members defining the upright elements, located to such positions that the necessary intervention thereon is allowed only if assembling between the panel constituting the cabinet top or base or close thereto and the respective surrounding frame has been not yet carried out.

Practically, still unresolved is the technical problem of how to arrange the top and base panels of each cabinet which have been already connected to the crosspiece section members preliminarily mounted in order to form the respective surrounding frames, without creating obstacles to the subsequent mounting steps.

SUMMARY OF THE INVENTION

Under this situation, the technical task underlying the present invention is to devise a bearing structure capable of overcoming the accepted limits of the known art and therefore eliminating in situ not only mounting of the crosspiece section members in order to form the surrounding frames for the cabinet top and base, but also the operating steps for applying respective closure panels thereto.

The technical task mentioned is substantially achieved by a bearing structure for cabinets containing electric and/or electronic apparatuses wherein the connectors further comprises connecting members between said first junction elements and the section members defining the upright elements adapted to be disposed at an operatively functional position for joining said surrounding frames to the upright elements themselves independently of the engagement of said panels defining the cabinet top and base with the respective surrounding frames.

BRIEF DESCRIPTION OF THE DRAWINGS

Description of a preferred non-exclusive embodiment of the bearing structure in accordance with the invention is now given, by way of non-limiting example, and illustrated in the drawings, in which.

DESCRIPTION OF THE PREFERRED EMBODIMENT

Figure 1:
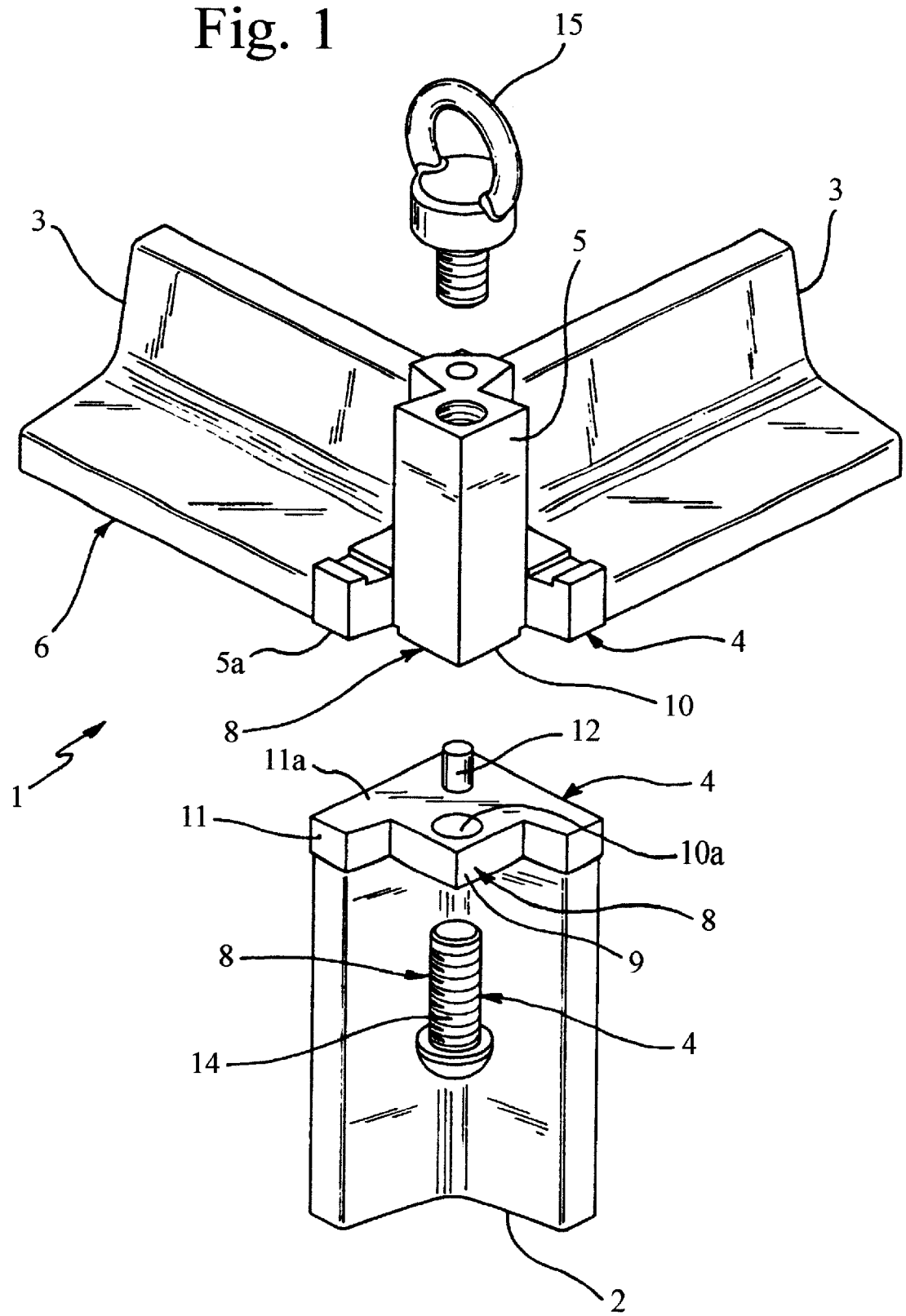
FIG. 1 is a partly exploded perspective view of the end portions of three section members converging at an upper vertex of a cabinet and the related connectors adapted to form a bearing structure in accordance with the invention.

With reference to the drawings, the bearing structure in accordance with the invention has been generally identified by reference numeral 1.

It comprises metal section members defining upright elements 2 and crosspiece elements 3 intended to be joined together at their ends by connectors 4 disposed in each cabinet vertex at which at least three of said section members converge, and more specifically two crosspiece elements 3 and one upright element 2.

Figure 2:
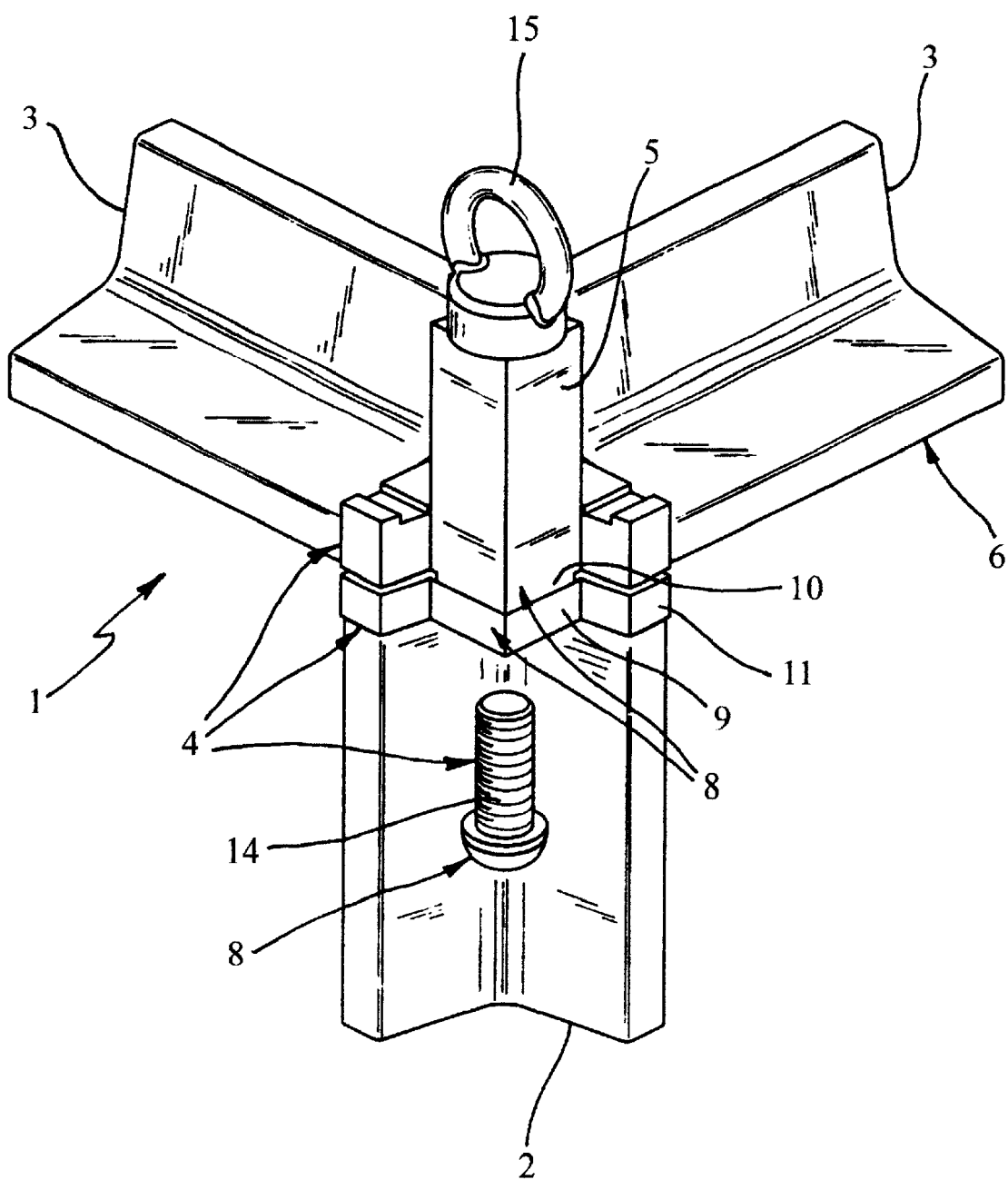
FIG. 2 is a perspective view of the components in FIG. 1, in an assembled position.
Figure 4:
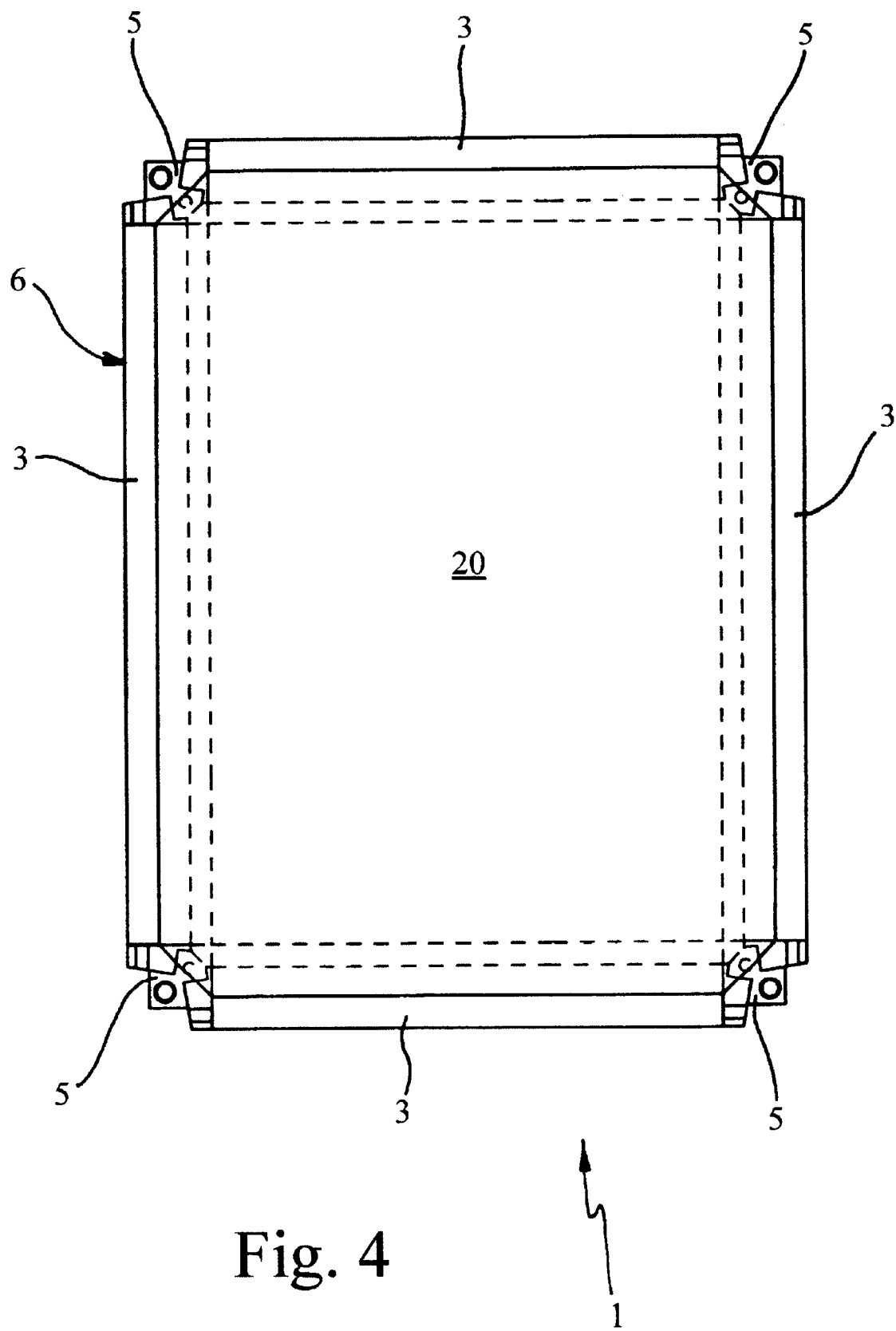
FIG. 4 is a top view of a surrounding frame carrying a panel or roof, mounted to a structure in accordance with the invention or relating thereto.
Figure 5:
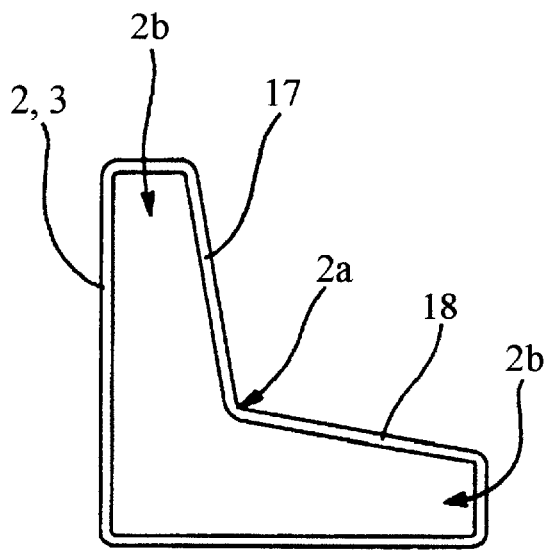
FIGS. 5 to 8 show different cross-section typologies of an upright element or a crosspiece element in accordance with the invention.

The connectors 4 comprises first junction elements 5 each adapted to rigidly connect the ends of two adjacent crosspiece elements 3 so that the same will be disposed substantially at right angles. Practically, four junction elements 5 and four crosspiece elements 3 form a first surrounding frame 6, partly shown in FIGS. 1 and 2 and represented in FIG. 4, which is intended to be the engagement support of a first panel or metal slab 20 defining the cabinet top or roof.

Figure 3:
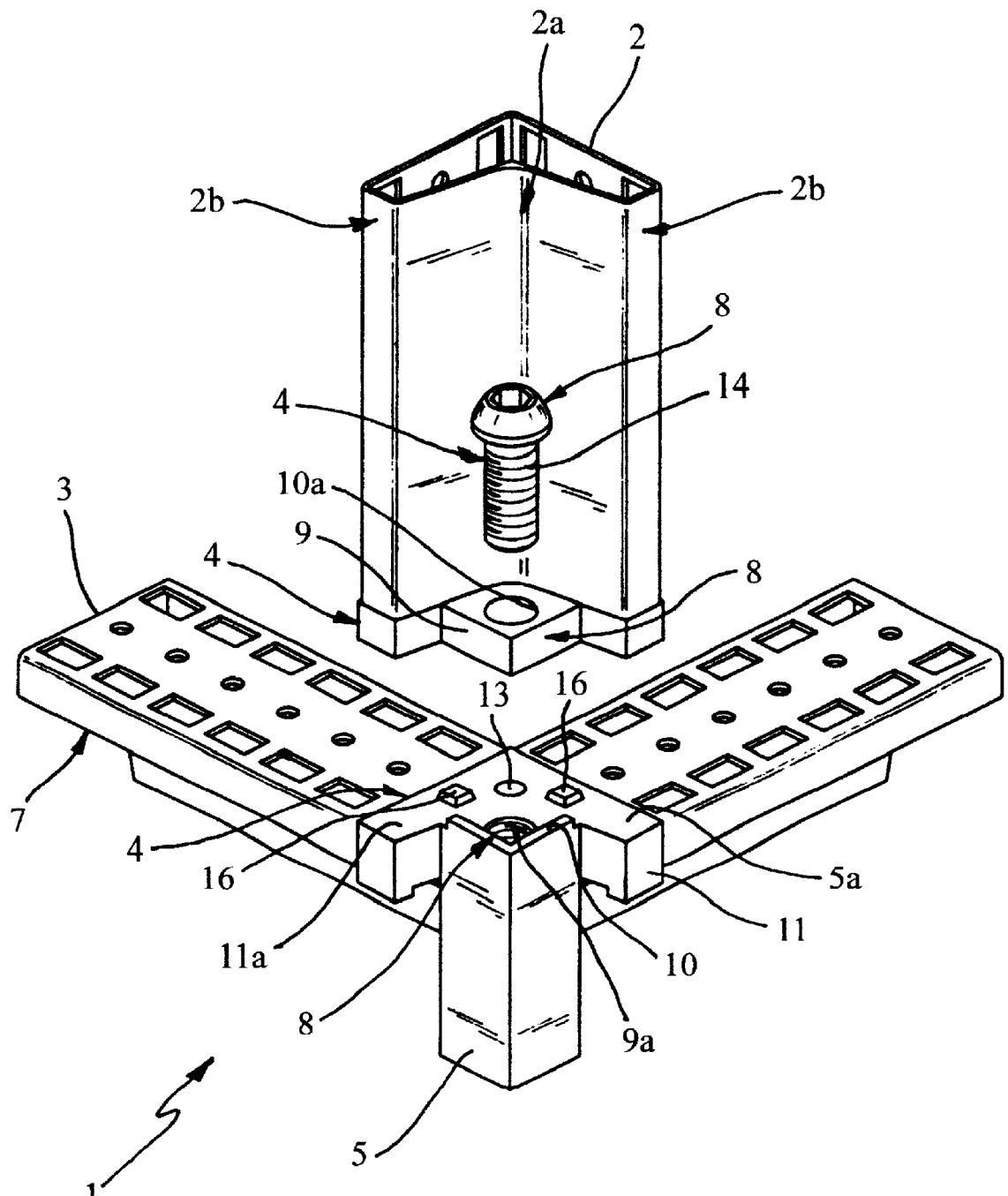
FIG. 3 is a partly exploded perspective view of the end portions of three section members converging at a lower vertex of a cabinet and the related connectors.

Likewise, four other junction elements 5, disposed upside down relative to the above mentioned four first junction elements, and four other crosspiece elements 3 form a second surrounding frame 7 partly shown in FIG. 3, which is intended to be the engagement support of a second panel (not shown in the drawings) defining the cabinet base.

In an original manner the connectors 4 further comprises connecting members 8 between the first junction elements 5 and the upright elements 2, adapted to be disposed at an operatively functional position (shown in FIG. 2) to join the upright elements 2 to said surrounding frames 6 and 7, independently of the engagement of said panels defining the cabinet top and base therewith.

Practically, the connecting members 8 relative to section members 2 and 3 are such located that intervention thereon can take place even when said panels defining the cabinet top and base have already been definitively assembled with the respective surrounding frames 6 and 7.

More specifically, the connecting members 8, for each cabinet vertex comprise a first anchoring portion 9 integral with the first junction element 5 and a second anchoring portion 10 integral with a second junction element 11 to be rigidly fastened to one end of an upright element 2.

The junction elements 5 and 11 have respective abutment surfaces 5a and 11a, partly defined by the corresponding anchoring portions 9 and 10, adapted to abut against each other at a precise assembling position defined by a dowel 12, emerging from face 11a for example, and a gauged hole 13 of lower length than the dowel, into which the latter can be fitted.

The connecting members 8 further comprise jointing means defined by a removable jointing element 14, a screw for example, adapted to keep the first and second anchoring portions 9 and 10 connected with each other. Said anchoring portions are such disposed that they project from the respective junction elements 5 and 11 in a manner adapted to create an appropriate operating space for screw 14, so that the latter may be easily rotated independently of the existing engagement of the panels defining the cabinet top and base with the respective surrounding frames 6 and 7. In other words, the possible presence of said top and base in their definitive assembling position does not restrict the operating space of screw 14.

In more detail, the second anchoring portion 10 of the second junction element 11, when it is operatively assembled with the upright, is disposed externally of the cross-section profile or contour of said upright element.

Advantageously, the metal section members defining the upright elements 2, and preferably also the section members forming the crosspiece elements 3, seen in cross-section have a contour comprising a recessed portion 2a forming a hollow intended to be turned outwardly of the closed volume defined by the cabinet. The first and second anchoring portions 9 and 10 of the connecting members 8 are, when they abut against each other in an operating position, disposed externally of the cross-section contour of the respective upright element 2 and more specifically internally of hollow 2a of said upright element, so that the hollow itself defines the operating space necessary for intervention on screw 14.

Practically, the cross section of the section members provided with said recessed portion or hollow 2a can be advantageously formed of a pair of wings 2b disposed at right angles so as to form a substantially L-shaped configuration.

Figure 6:
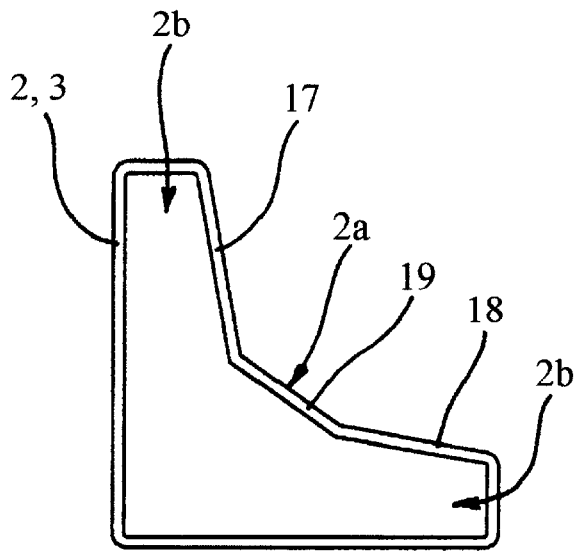
Figure 7:
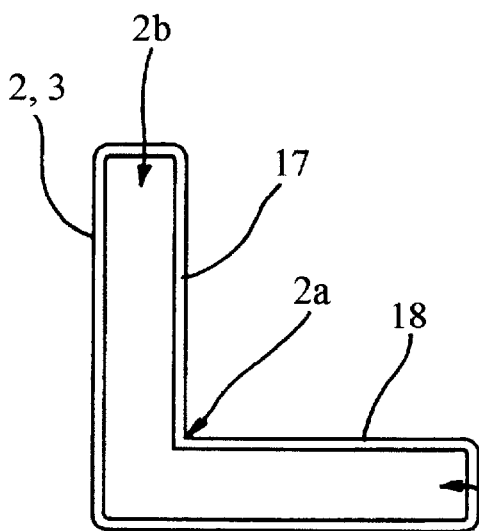
Figure 8:
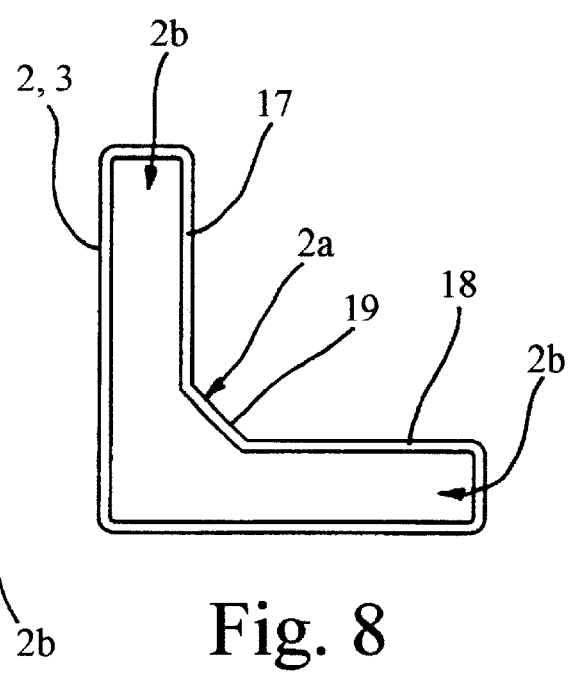

As can be seen from FIGS. 5 to 8, the shape of the L-shaped section can take different appearances depending on whether it is delimited by sides 17, 18 defining the concavity which are perpendicular to each other (FIG. 7), possibly interconnected by a third inclined side 19 (FIG. 8), or it is delimited by sides 17, 18 that are inclined relative to each other so as to form an angle greater than 90° (FIG. 5), possibly interconnected by a third side 19, inclined to the two first sides (FIG. 6).

To make connection between the anchoring portions 9 and 10, the first anchoring portion has a threaded hole 9a and the second one has a through hole 10a through which a screw 14 is fitted, the head of which is therefore accessible from hollow 2a of the upright element 2. Preferably the threaded hole 9a is a through hole going through the first anchoring portion 9 so that, when the first junction element 5 is used in the upper vertices of the cabinet, a lifting eyebolt 15 can be screwed down therein.

Finally, to keep a limited clearance of predetermined amount between the abutment faces 5a and 11a so that a seal interposed therebetween is not subjected to a too high compression that could impair integrity during tightening of screw 14, spacing extensions 16 partly located in a suitable manner on the edge of the anchoring portion 9, emerge from one of said abutment faces, that of the first junction element 5 for example.

The invention achieves important advantages.

In fact, the original arrangement of the connecting members adapted to join the first junction elements, which together with the crosspiece section members form the surrounding frames for support of the panels defining the cabinet top and base, to the second upright junction elements integral thereto, enables an operating space to be created for the connecting members themselves which is always available, even when said panels have already been anchored to their surrounding frames.

Thus, said surrounding frames can be arranged in a completely assembled manner and can be engaged with the cabinet top and base panels, so that operations in situ for a cabinet mounting are restricted to connection of the upright elements and application of the side closure panels and doors.

In addition, the particular concave shape of the upright profile and positioning of the connecting portions at the concavities, enables the structure bulkiness not to be increased, so that an easy and comfortable access from the outside is ensured.

What is claimed is:

1. A bearing structure for cabinets, preferably containing electric and/or electronic apparatuses, comprising:

a predetermined number of metal section members defining crosspiece elements (3), said crosspiece elements (3) being disposed so as to define at least one first and one second surrounding frame (6,7) respectively intended to be an engagement support of a first metal panel defining the cabinet roof or top and of a second metal panel defining the cabinet base or floor;

a predetermined number of metal section members defining upright elements (2), said upright elements (2) being interposed between the first and the second surrounding frames along an assembling direction substantially perpendicular to said first and said second surrounding frames (6,7), the upright elements (2) presenting a cross section defining a substantially L shaped internal cavity, said upright elements (2) having an inner central edge substantially parallel to said assembling direction and directly exposed into the internal closed volume defined by the cabinet (1) and having an external recessed portion (2a) forming a hollow intended for being turned outwardly of the closed volume defined by the cabinet (1) and opposite to said inner central edge, said recessed portion (2a) being directly exposed to the external environment;

first junction elements (5) operatively acting between the crosspiece elements (3) to form the first and the second surrounding frames (6,7);

second junction elements (11) adapted to be rigidly fastened to the upright elements (2), said second junction elements (11) comprising at least a second anchoring portion (10) protruding from the upright element (2) cross section contour along a direction substantially perpendicular to the assembling direction and emerging in correspondence of the recessed portion (2a), the recessed portion (2a) being an external surface of the upright element (2); and at least a removable joining element (14) operatively located externally to the internal cavity of the upright element (2) and acting between the first junction members (5) and the second anchoring portion (10) emerging from the upright element (2).

2. The structure as claimed in claim 1, further comprising a first anchoring portion (9) integral with and projecting from the first junction elements (5), said removable joining element (14) engaging the second anchoring portion (10) to the first anchoring portion (9) in operative conditions.

3. The structure as claimed in claim 2, wherein the first and the second anchoring portions (9,10) are disposed internally of said hollow (2a) of the corresponding upright element (2), so that the hollow (2a) itself defines an operating space for the removable joining element (14).

4. The structure as claimed in claim 3, wherein the cross section of the metal section members defining at least the upright elements (2) comprises two hollow wings (2b) adapted to create said substantially L shaped internal cavity, said hollow wings (2b) delimiting the recessed portion (2a) and being joined together in correspondence of said inner central edge of the upright element (2).

5. The structure as claimed in claim 1, wherein said at least one removable joining element (14) is defined by a tightening screw, the first anchoring portion (9) having a threaded hole and the second anchoring portion (10) has a corresponding trough hole (10a) for inserting said tightening screw.

6. The structure as claimed in claim 1, wherein the first and second abutment surfaces (5a, 11a) are partly defined by the first and second anchoring portions (9,10) and have spacing extensions (16) adapted, in an operating position, to keep a predetermined clearance between the abutment surfaces and emerging from at least one of said first or second abutment surfaces (5a, 11a).

7. A bearing structure for cabinets, preferably containing electric and/or electronic apparatuses, comprising:

a predetermined number of metal section members defining crosspiece elements (3), said crosspiece elements (3) being disposed so as to define at least one first and one second surrounding frame (6,7) respectively intended to be an engagement support of a first metal panel defining the cabinet roof or top and of a second metal panel defining the cabinet base or floor;

a predetermined number of metal section members defining upright elements (2), said upright elements (2) being interposed between the first and the second surrounding frames (6,7) along an assembling direction substantially perpendicular to said first and said second surrounding frames (6,7), the upright elements (2) having an external surface directly exposed to the external environment and substantially parallel to said assembling direction; and first junction elements (5) operatively acting between the crosspiece elements (3) to form the first and the second surrounding frames (6,7) and presenting a first abutment surface (5a) turned towards the external surface of the upright element (2);

second junction elements (11) adapted to be rigidly fastened to the upright elements (2), said second junction elements (11) presenting a second abutment surface (11a) adjacent to and operatively in abutment with said first abutment surface (5a) and a third abutment surface opposite to sad second abutment surface (11a) and faced to the upright elements (2); and at least a removable jointing element (14) operatively acting between the first and the second junction members (5,11), said removable jointing element (14) comprising a fourth abutment surface facing to and, in operative conditions, in abutment with said third abutment surface of the second junction element (11).

8. The structure as claimed in claim 7, further comprising a second anchoring portion (10) connected to a second junction element (11) and located externally of a cross section contour of the respective upright element (2), said second anchoring portion (10) presenting a second abutment surface (11a) adapted to be at least partially in abutment on the first junction elements (5) and a third abutment surface opposite to said second abutment surface (11a) and directly exposed to the outside environment in an operating condition wherein the second junction element (11) is connected to the upright element (2).

9. The structure as claimed in claim 8, further comprising a first anchoring portion (9) integral with the first junction elements (5), the first and the second anchoring portions (9,10) being projecting from the respective first and second junction elements (5,11), in a manner adapted to create an operating space for the removable joining element (14) independently from the engagement of said metal panels defining the cabinet top and base with the respective surrounding frames (6,7).

10. The structure as claimed in claim 7, wherein the second anchoring portion (10) is, in an operating position, disposed externally of a cross section contour of the respective upright element (2).

11. The structure as claimed in claim 7, wherein at least the metal section members defining the upright elements (2) seen in cross section have a contour comprising a recessed portion (2a) forming a hollow intended for being turned outwardly of the closed volume defined by the cabinet, and wherein the first and second anchoring portions (9,10) are, in an operating position, disposed externally of said cross section contour of the respective upright element (2).

12. The structure as claimed in claim 7, wherein the cross section of the metal section members defining at least the upright elements (2) comprises two wings (2b) adapted to create a substantially L shaped configuration and defining the hollow (2a) corresponding to said recessed portion.

13. The structure as claimed in claim 7, wherein said at least one removable joining element (14) is defined by a tightening screw, wherein the first anchoring portion (9) has a threaded hole and wherein the second anchoring portion (10) has a corresponding trough hole (10a) for said tightening screw.

14. A bearing structure for cabinets, preferably containing electric and/or electronic apparatuses, comprising:

a predetermined number of metal section members defining crosspiece elements (3), said crosspiece elements (3) being disposed so as to define at least one first and one second surrounding frame (6,7) respectively intended to be an engagement support of a first metal panel defining the cabinet roof or top and of a second metal panel defining the cabinet base or floor;

a predetermined number of metal section members defining upright elements (2), said upright elements (2) being interposed between the first and the second surrounding frames (6,7) along an assembling direction substantially perpendicular to said first and said second surrounding frames (6,7) the upright elements (2) also having an external surface directly exposed to the environment and substantially parallel to said assembling direction;

first junction elements (5) operatively acting between the crosspiece elements (3) to form the first and the second surrounding frames (6,7);

second junction elements (11) operatively acting between the upright elements (2) and said first junction elements (5) to join the first and the second surrounding frames (6,7) to the upright elements (2) themselves, said second junction elements (11) further comprising a second anchoring portion (10) located externally of a cross section contour of the respective upright element (2), said second anchoring portion (10) having a second abutment surface (11a) and a third abutment surface opposite to said second abutment surface (11a), said second anchoring portion (10) having also a trough hole (10a) extending from an inlet opening lying on said third abutment surface to an outlet opening lying on said second abutment surface (11a), the inlet opening of said through hole (10a) being directly exposed to the outside environment and turned towards the external surface of the upright element (2); and a removable jointing element (14) inserted in the through hole (10a) and operatively acting to connect the first and the second junction elements (5,11).

15. The structure as claimed in claim 14, further comprising first and second anchoring portions (9,10) which are projecting from the respective first and second junction elements (5,11), in a manner adapted to create an operating space for the removable joining element (14) independently from the engagement of said metal panels defining the cabinet top and base with the respective surrounding frames (6,7).

16. The structure as claimed in claim 14 wherein at least the metal section members defining the upright elements (2) seen in cross section have a contour comprising a recessed portion (2a) forming a hollow intended for being turned outwardly of the closed volume defined by the cabinet, and wherein the first and second anchoring portions (9,10) are, in an operating position, disposed externally of said cross section contour of the respective upright element (2).

17. The structure as claimed in claim 14, wherein the cross section of the metal section members defining at least the upright elements (2) comprises two wings (2b) adapted to create a substantially L shaped internal cavity and defining said recessed portion (2a).

* * * * *